United States Patent
Day et al.

(10) Patent No.: US 6,249,782 B1
(45) Date of Patent: Jun. 19, 2001

(54) SYSTEM AND METHOD FOR REDUCING FILE NAME LENGTH AND FOR RETRIEVING THE REDUCED FILE NAME ENTITLED FILES

(75) Inventors: Mark S. Day, Saratoga; Donald J. Brady; Deric S. Horn, both of San Jose, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/213,201

(22) Filed: Dec. 17, 1998

(51) Int. Cl.⁷ ........................................................ G06F 17/30

(52) U.S. Cl. .................................................. 707/2; 707/102

(58) Field of Search .................................. 707/1, 2, 100, 707/101, 102, 200, 205

(56) References Cited

U.S. PATENT DOCUMENTS

| | | | |
|---|---|---|---|
| 5,745,902 | * | 4/1998 | Miller et al. ........................... 707/200 |
| 5,758,352 | * | 5/1998 | Reynolds et al. ..................... 707/200 |
| 5,765,169 | * | 6/1998 | Conner .................................. 707/200 |

OTHER PUBLICATIONS

Optical Storage Technology Association, *Universal Disk Format™ Specification*, Revision 1.02, pp. 74 & 75, 83–87 (Aug. 30, 1996).

* cited by examiner

Primary Examiner—Thomas Black
Assistant Examiner—John C. Loomis
(74) Attorney, Agent, or Firm—Carr & Ferrell, LLP (57) ABSTRACT

A system and method are disclosed for reducing file names and for retrieving files having reduced file names. In response to a request to access file names that are not supportable by an applications programming interface (API), a file manager program retrieves an original file name having an original file name length and an original file identifier. Next, the file manager divides the original file name into a set of primary characters and a set of extension characters. A shortened identifier having a set of shortened identifier characters is created by encoding the original file identifier. The primary characters are then truncated. A reduced file name is then created by combining the truncated characters, a reduced file name marker, the shortened identifier, and the extension characters. Files having reduced names are retrieved by a file manager that identifies a set of shortened identifier characters in a reduced file name, decodes the shortened identifier characters, and retrieves a file based on the decoded identifier characters from a data volume.

47 Claims, 5 Drawing Sheets

| Max. Allowable Bytes | - | Marker | - | Encoded Identifier | - | Extension | = | Remaining Char. |
|---|---|---|---|---|---|---|---|---|
| 31 | - | 1 | - | 2 | - | 5 | = | 23 |

SYSTEM AND METHOD FOR REDUCING FILE NAME LENGTH AND FOR RETRIEVING THE REDUCED FILE NAME ENTITLED FILES

BACKGROUND OF THE INVENTION

1. Field of the Invention

The present invention relates to reducing lengths of computer file names and for retrieving files with reduced length names. More particularly, the invention relates to using a unique file identifier for reducing file names and for retrieving files with reduced length names.

2. Discussion of Background Art

Many existing Application Programming Interfaces (APIs) only support file names that contain thirty-one (31) or fewer characters. Other APIs, however, permit file names as long as 255 characters or longer. Hence, a problem arises when a file name longer than 31 characters needs to be accessed via an API which only permits a maximum file length of 31 characters. Additionally, many APIs have a limited set of representable or allowable characters and, thus, cannot effectively support file names that include characters not within a given API's set of allowable characters.

One manner in which the prior art has accommodated overlength file names is by merely truncating the portion of the file name that exceeds the maximum permitted file name length. For example, if a file name is 145 characters long, the final 114 characters (the number of characters in excess of 31) are truncated from the end of the file name to create a file name of acceptable length. This approach presents a number of problems.

For example, one significant limitation with merely truncating the portion of the file name in excess of the maximum allowable length is that a given data volume may contain a number of distinct, but lengthy, names which, when truncated, become identical. That is, the distinguishing features of a file name may be located toward the end of the file name and would thus be removed by the truncation, potentially rendering several truncated file names identical. Having identical file names associated with different files is highly undesirable and problematic in that the different files having identical truncated file names cannot be distinguished by file name.

An additional problem associated with this approach is that by truncating the end of the file name, valuable information that may be present in a file name extension is lost. In general, file names frequently have extensions appended to the end of the file name to indicate the type of content in the associated file. For example, the file name extension of the file name "example.txt" is the character string ".txt" which indicates to the system and to the user that the file associated with this file name is a text file and should be opened with an application appropriate for such a file type. By merely truncating the end of a file name, the extension is deleted and valuable information concerning the type of the file contents is lost. Consequently, this approach is highly unsatisfactory for many applications.

Another approach has been to truncate a lengthy file name and to then modify the truncated name until the name becomes unique. This approach, however, requires that copies of the lengthy file names and the associated truncated file names be continuously maintained and monitored to verify that all the lengthy file names and all the truncated file names are always unique. The requirement of maintaining and searching through both sets of file names, on a continual basis, to confirm that both sets of file names are unique, may create system performance problems and, therefore, makes this approach undesirable.

Other attempts to address the problem of reducing the lengths of file names have employed a probabilistic approach in which the shortened file names are likely, but not guaranteed, to be unique. One of these attempts addresses the problem by truncating the file name and then appending a number, based on a check sum of the entire name, to the truncated file name. A check sum is a formula through which the characters of a file name may be passed to arrive at a number. Unfortunately, however, like some of the other approaches, this probabilistic approach is limited in that the shortened file names are not guaranteed to be unique.

Consequently, a need exists for a system and method for reliably reducing the length of a file name that guarantees a unique reduced file name. Such a method should not be so burdensome that the creation and use of reduced file names significantly reduces the performance of the system. Moreover, such a system and method should preserve the valuable information regarding file type found in the file name extension. Lastly, an additional need exists to provide a system and method for reliably reducing a file name including unrepresentable characters into a unique representable file name.

SUMMARY OF THE INVENTION

The present invention is directed to reducing unsupportable file names. Indeed, the present invention provides a system and method for reducing file names to be supportable by a given Applications Programming Interface (API) while, at the same time, guaranteeing that all file names are unique by embedding a unique file identifier within each reduced file name. A system and method are also provided by which a file may be located using a reduced file name.

In general, a file name longer than those supportable by a given API is truncated. After the name has been truncated, a unique file identifier is appended to the truncated file name to guarantee the uniqueness of the file name after truncation. Advantageously, the file identifier is a unique number created and associated with a file upon creation of the file. In this manner, the uniqueness of the reduced file name is guaranteed.

Some file names contain characters that are not representable by a given-API because such characters may not be within the API's set of representable or allowable characters. Where the original file name contains unrepresentable characters, each unrepresentable character is replaced with a representable character. Alternatively, each contiguous sequence of unrepresentable characters could be replaced with a single representable character to further conserve file name length. A unique file name identifier is then appended to the file name to create a reduced file name that is supportable by the API and is guaranteed to be unique.

In particular, one embodiment of the present invention reduces a file name by first receiving an original file name associated with a given file in a particular volume. A unique file identifier associated with the file is also received. Next, if the file name is too long, a portion of the original file name is truncated. If the file name contains unrepresentable characters, the system replaces each unrepresentable character with a representable character. The file identifier is then combined with the remaining characters of the file name, together with a reduced file name marker and the file name extension, to create a reduced file name.

More specifically, the present invention includes a system and method for reducing file name length and for retrieving the reduced file name entitled files. In response to a request to call up a file name that has a length longer than that supported by a given API, a file manager program first retrieves an original file name having an original file name length and an original file identifier. Next, the file manager divides the original file name into a set of original file name primary characters and a set of extension characters. By encoding the original file identifier, a shortened, or encoded, identifier having a set of shortened identifier characters is created. In a preferred embodiment, the original file identifier is a binary number that may be encoded by conversion to an equivalent, but shorter, hexadecimal number. Alternately, the original file identifier could be otherwise encoded by conversion to a number system more compact than hexadecimal to further conserve file name length.

The reduced file name length should be no longer than a maximum file name length supportable by the API so that the reduced file name can pass through the API. To this end, the number of shortened identifier characters and the number of extension characters, together with any reduced file name marker, are subtracted from the reduced file name length, to yield a number of remaining characters. A portion of the set of original file name characters equal in length to the number of remaining characters is concatenated, or combined, with the set of shortened identifier characters and the set of extension characters to create a reduced file name.

To retrieve a file based on a reduced file name, the file manager identifies a set of identifier characters embedded within the reduced file name. If the identifier characters are encoded, they are decoded to yield an original file identifier. The file associated with the reduced file name is then identified by the original file identifier and is retrieved directly from a data volume. Lastly, the identity of the retrieved file may be verified by reducing the original file name of the retrieved file to create a verifying reduced name. If the verifying reduced name is identical to the received reduced file name, the identity of the file is confirmed.

Reducing an unsupportable file name in accordance with the present invention is advantageous for a number of reasons. Perhaps most significantly, a reduced file name, according to the present invention, has embedded therein a unique file identifier that guarantees that the reduced file name will be unique. Additionally, the reduced file name preserves any extension so that both the user and the system can readily determine the type of the associated file contents. Moreover, the beginning portion of the original file name is preserved to assist the user in identifying the associated file. Other advantages and features of the present invention will be apparent from the drawings and detailed description as set forth below.

DETAILED DESCRIPTION OF THE PREFERRED EMBODIMENT

Figure 1:
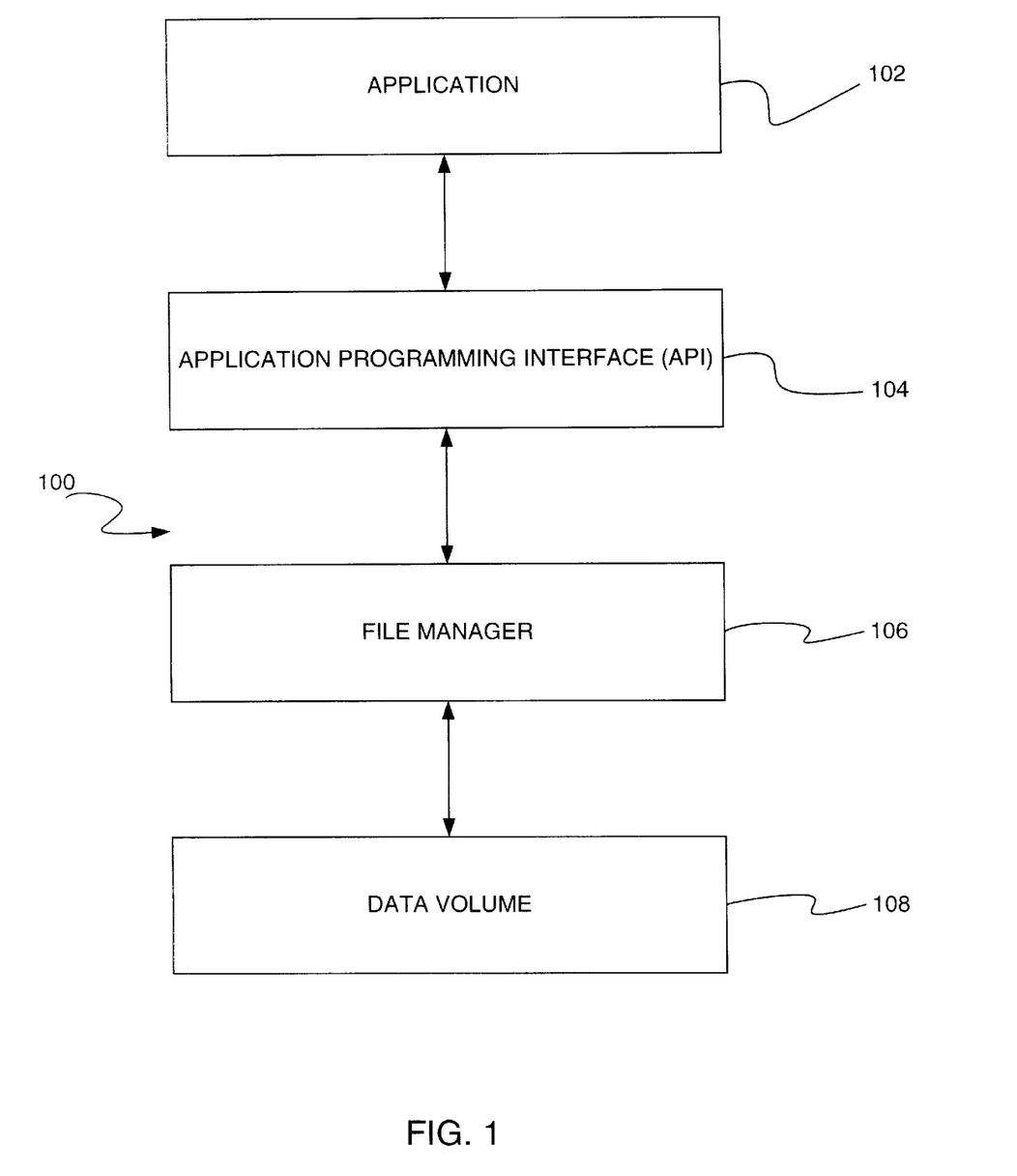
FIG. 1 is a block diagram showing a system for reducing file names and for retrieving files having reduced names according to the present invention.

FIG. 1 shows a system 100 for reducing file names and for retrieving files using reduced file names. In the present disclosure, the term "file name" means the name of a file or the name of a directory. Likewise, the term "file" refers to a file or a directory.

As illustrated, the system 100 includes a software application 102, an Application Programming Interface (API) 104, a file manager 106, and a data volume 108. In general, the software application 102 sends and receives information, via the API 104, to and from the file manager 106. Indeed, it is through the API 104 that the software application 102 causes the file manager 106 to perform such tasks as accessing, creating, and deleting files on the data volume 108.

Unfortunately, as discussed above, some data volumes store file names that are too long (i.e. longer than the associated API can send or receive) or file names with characters that are not representable by a given API 104. Indeed, some APIs may only support a maximum file name length of 31 bytes and have a limited set of supportable characters. Those skilled in the art will appreciate that the present method may be used in connection with original file names comprising single byte characters, double byte characters, or both. To overcome, or substantially alleviate, this problem, the file manager 106 "reduces" or modifies original file names that are either too long or contain unrepresentable characters to create unique and valid names that are supportable by a given API 104.

Figure 2:
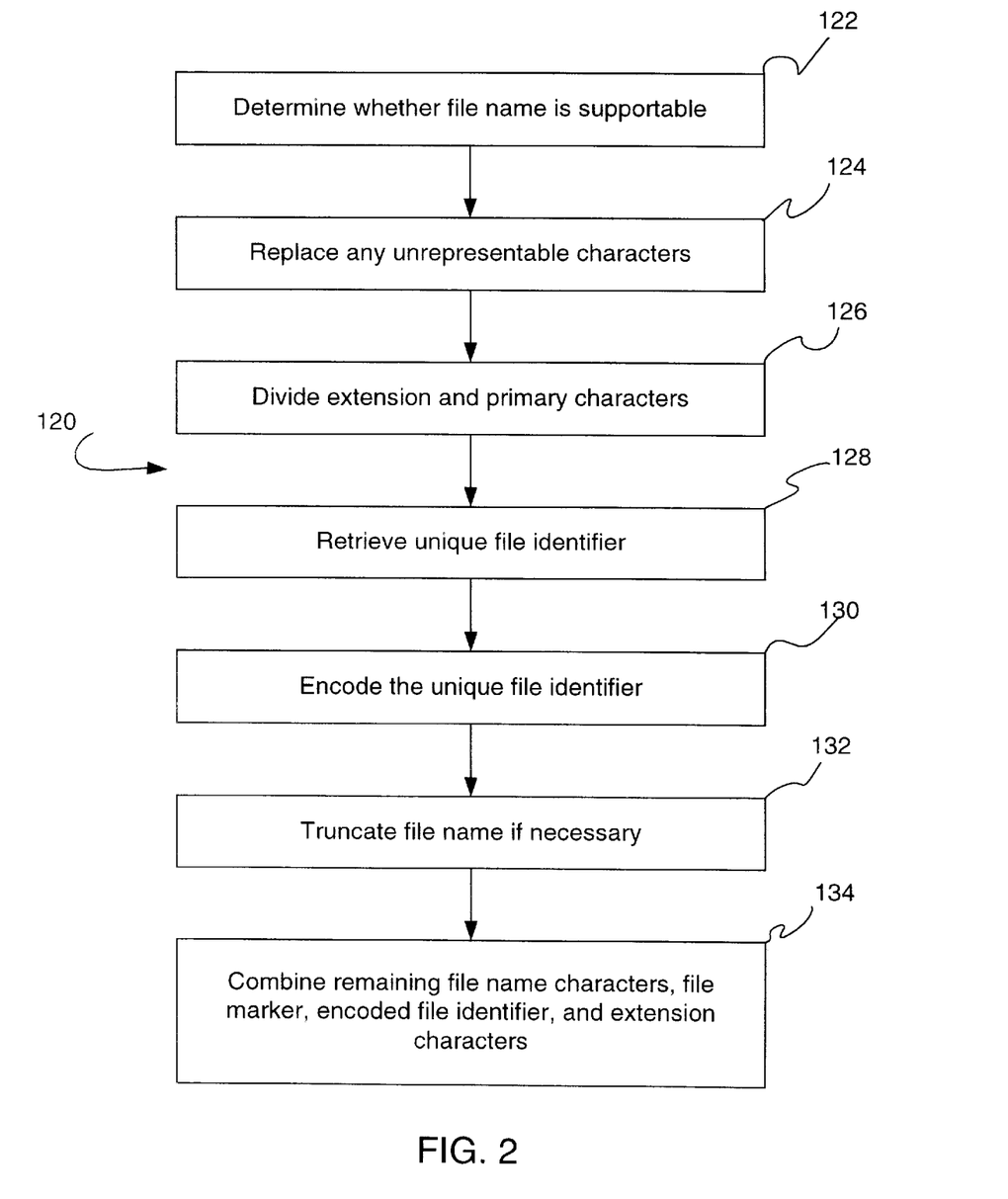
FIG. 2 is a flowchart illustrating a method of reducing a file name according to the invention.

FIG. 2 is a flowchart 120 that illustrates a method of reducing a file name in accordance with the present invention. As indicated by block 122, the first task is to determine whether an original file name, as retrieved, is unsupportable by a given API 104 (FIG. 1). If the original file name is supportable by the API 104, then the original file name is returned and the remaining steps of the flowchart 120 may be skipped.

In the illustrated embodiment, the length of the original file name is checked to determine whether the original file name is too long to be represented by the API 104. Specifically, the byte length of the original file name is compared with a maximum file name length supportable by the API. If the length of the original file name is greater than the maximum file name length, then the original file name must be reduced in order to acceptably pass through the API 104. As discussed above, the maximum file name length for many systems is 31 bytes. Hence, for file names comprising only single byte characters, the maximum file name length for many systems is 31 characters.

The file manager 106 (FIG. 1) also checks the original file name to determine whether the original file name contains unrepresentable characters. That is, the file manager checks for characters not allowable by the API (i.e. not part of the allowable character set). For example, some Japanese ideographs are not part of the allowable character set of some APIs. If the original file name contains one or more unrepresentable characters, then the original file name must be reduced in order to acceptably pass through the API 104.

Next, as indicated by block 124, each unrepresentable character of the original file name, if any, is replaced with a representable character. By replacing each unrepresentable character in the original file name with a representable character, the original file name characters are made to conform to the supported or allowable character set of the API 104. In a preferred embodiment, each unrepresentable character is replaced with an ASCII underscore "". In another embodiment, each unrepresentable character is replaced with an ASCII question mark "?". Alternatively, each contiguous sequence of unrepresentable characters could be replaced with a single representable character to further conserve file name length.

At this point, as illustrated by block 126, any original file name extension characters are divided from a set of original file name primary characters. In other words, the original file name extension portion is divided from the original file name primary portion. Many file names include a set of extension characters that indicate to the system and to the user the type of content of the associated file. For example, the file name "example.txt" has as a primary portion the primary characters "example" and has as an extension portion the extension characters ".txt". Typically, the extension characters will include an ASCII period (".") followed by a series of characters. In this example, the extension characters ".txt" indicate to the system and to the user that the associated file is a text file and, as such, should be opened with an appropriate application. Because the extension portion of a file name readily indicates to both system and user the general type of the contents of the associated file, the extension portion is, in many instances, a valuable aspect of the file name.

As represented by block 128, a unique file identifier associated with the file is then retrieved. In a preferred embodiment, each file on a given volume has a unique file identifier associated with the file upon creation of the file. Those of ordinary skill in the art will recognize that the term "volume" generally refers to an entire storage device or a partitioned portion of a storage device.

Advantageously, the unique file identifiers are numbers sequentially assigned to files as the files are created. To prevent the possibility of having two files within a directory with the same file identifier, file identifiers associated with deleted files are not reused. Each file, upon creation in a given volume, has a unique file identifier associated with the file. By this method, the file identifiers are guaranteed to be unique within an given directory on the volume.

Figure 3:
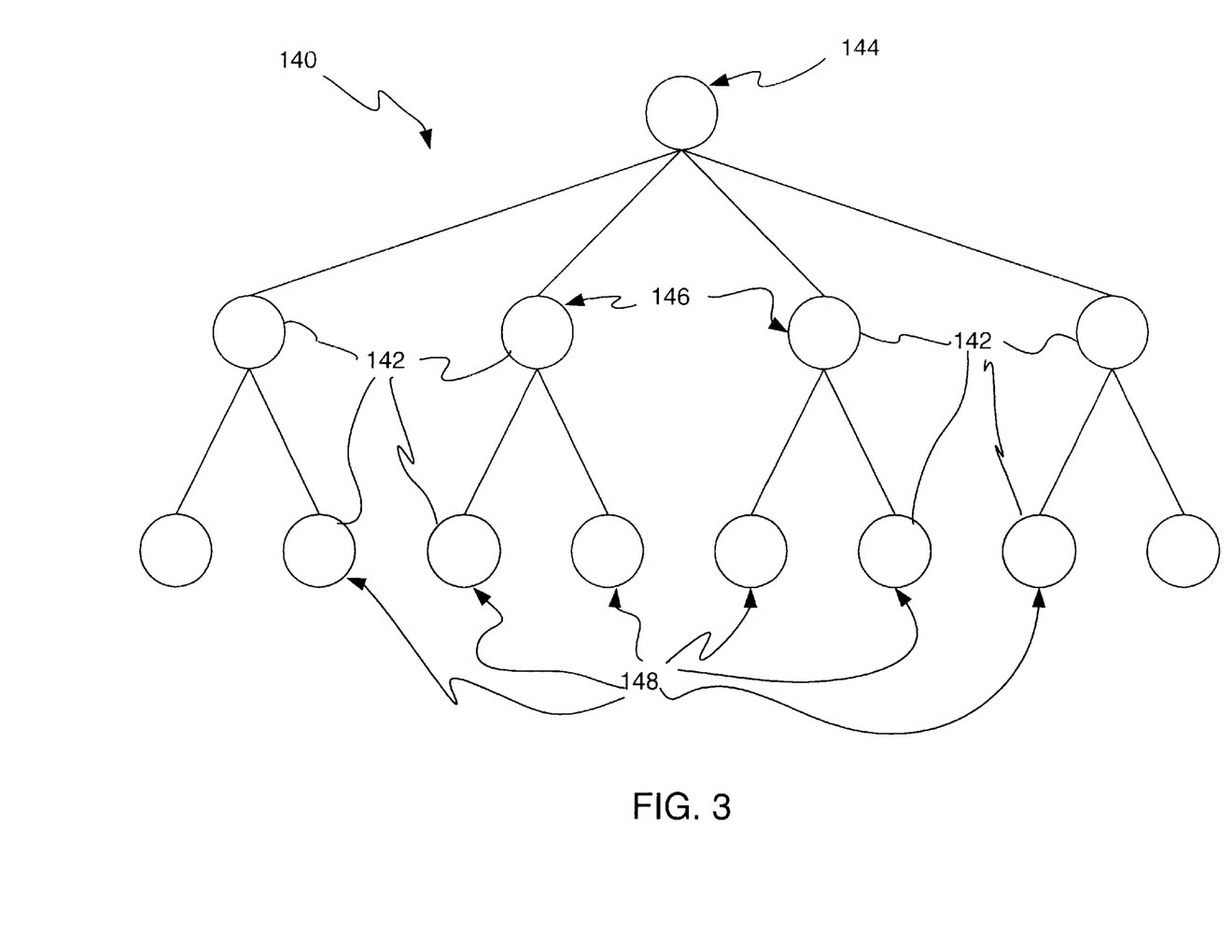
FIG. 3 illustrates a data structure used in connection with the invention.

Those skilled in the art will appreciate that a unique file identifier may be associated with each file on a given volume in a variety of ways. As illustrated in FIG. 3, a presently preferred manner of creating a unique file identifier for each file on a given volume uses a data structure 140 which is a catalog file organized as a "B-tree" formed of a set of logic nodes 142. Each file identified by the structure 140 is associated with a unique node.

Specifically, the data structure 140 includes at the top a root node 144, which in turn has two or more branches to associated "child" nodes 146. There also may be other child nodes 148 associated with the child nodes 146. The child nodes 148 at the bottom of the tree are referred to as "leaf" nodes. It is at the leaf nodes that useful data is stored. Advantageously, each leaf node is at the same "height," or the same number of nodes away from the root node 144, to enhance the balance of the data structure 140 and to make the data stored within the data structure quickly accessible.

In the data structure 140, each node 142 contains two or more catalog records. It is in the catalog records where the unique file identifier is stored. In this manner, as new files are created, a unique file identifier, as described above, is stored in the associated catalog record. The unique file identifier serves as a key to a record that contains the parent directory and name of the file associated with that unique file identifier. This record may be referred to as a "thread." It is the existence of this thread record that permits a file to be quickly looked up based solely on its unique file identifier.

While the unique file identifier may be generated in the manner described above and illustrated in FIG. 3, it should be understood that the present invention may also be employed in connection with other volume formats. Indeed, the unique file identifier could be stored with the name of the file, with the contents of the file, or elsewhere. Thus, the method of generating a unique file identifier described above is merely a presently preferred method. Other methods of generating the unique file identifier will be readily apparent to those skilled in the art.

Returning to FIG. 2, once the unique file identifier has been retrieved, the unique file number is encoded as represented by block 130. In the preferred embodiment, the unique file number is a unique 32-bit binary number. In order for the 32-bit number to be represented as a part of a reduced file name, the 32-bit number must be encoded or otherwise shortened.

A presently preferred manner of encoding, or shortening, the 32-bit binary number file identifier is to convert the 32-bit binary number into an equivalent hexadecimal number (without any leading zeros) so that the unique file identifier can be represented in many fewer characters in a reduced file name. Using this approach, an unencoded unique file identifier binary number of "00000000000000000000000001101001", for example, can be conveniently encoded and represented in hexadecimal as "69" and, therefore, can be more easily incorporated as a part of a reduced file name. Alternately, the original file identifier could be otherwise encoded by conversion to an identifier system more compact than hexadecimal (i.e. uses more than 16 distinct characters) to further conserve file name length.

Next, as represented by block 132, the original file name is truncated, if necessary. As discussed above, many file names are too long to be supported by an API having a file name length limit of 31 bytes (i.e. 31 characters assuming single byte characters). Hence, given an original file name with a length in excess of the file name length limit, the original file name must be truncated.

In the preferred embodiment, the end of the primary portion of the original file name is the part of the original file name that is truncated. As discussed above, the extension portion of the file name is frequently valuable in that it conveys to the system and the user information concerning the type of contents of the associated file. Consequently, it is undesirable to truncate, and thus lose, this valuable portion of the original file name. Additionally, it has been found that users tend to rely heavily on the first part of the file name in distinguishing between files. Therefore, it is also undesirable to lose this portion of the file name.

In operation, the number of characters to be truncated from the end of the primary portion of the original file name must be determined. This is accomplished for an original file name comprising only single byte characters by subtracting the number of characters of the encoded file identifier and the number of extension characters, and the number of reduced file name marker characters (reduced file name marker characters are discussed below), from the maximum acceptable file name length to yield a number of remaining useable characters. All characters in excess of the number of remaining useable characters are truncated from the end of the primary portion of the original file name to yield a set of remaining characters. By this technique, the "reduced" file name will have an acceptable byte length when the reduced file name marker, encoded file identifier, and extension are appended to the remaining useable characters as discussed below.

Original file names having double byte characters are similarly truncated by subtracting the number of bytes of the encoded file identifier, the number of extension character bytes, and the number of marker character bytes from the maximum acceptable number of file name bytes to yield a number of remaining useable bytes. All characters in excess of the characters fully representable by the remaining useable bytes are truncated from the end of the original file name primary portion to yield a set of remaining useable characters.

Lastly, as represented by block 134, the remaining useable characters, the reduced file name marker, the file identifier as encoded, and the extension portion are concatenated, or strung together in series, to form a reduced file name. Consequently, a reduced file name formed in accordance with this presently preferred embodiment will comprise, seriatim, the remaining characters, the reduced file name marker, the encoded file identifier, and the extension portion.

To assist both the user and the system in recognizing a reduced file name, it is advantageous to include a reduced file name marker within the reduced file name. In a preferred embodiment, the reduced file name marker is the ASCII pound sign ("#") and is positioned within the reduced file name as discussed above. Specifically, in this embodiment, the reduced file name marker is positioned between the remaining characters and the file identifier, as encoded. However, it should be appreciated that the reduced file name marker may be a different character, may include more than one character, and may be positioned elsewhere in the reduced file name.

Thus, the reduced file name has certain desirable characteristics. Perhaps most significantly, the reduced file name has embedded therein a unique file identifier that guarantees that the reduced file name will be unique. Additionally, the reduced file name preserves any extension so that both the user and the system can readily determine the type of the associated file contents. Moreover, the beginning portion of the original file name is preserved to assist the user in identifying the associated file.

Figure 4A:
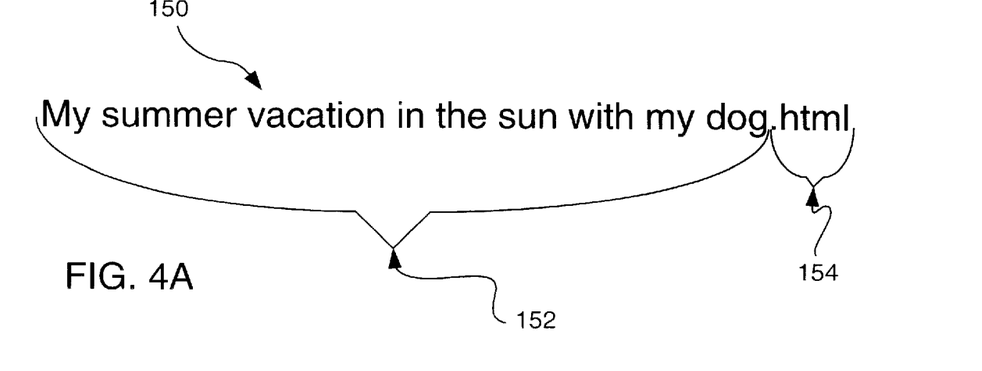
FIG. 4A illustrates an original file name.

FIGS. 4A, 4B, 4C, and 4D illustrate the reduction of an example overlength original file name 150 in accordance with the present invention. As shown in FIG. 4A, the original file name 150 is as follows:

"My summer vacation in the sun with my dog.html".

The original file name 150 comprises forty-six (46) characters (including the spaces between words). Hence, the original file name 150 is too long to be supported by an API with a maximum file name character limit of 31 characters, and must be reduced.

As shown, the original file name 150 includes a primary portion 152 made up of a set of primary characters, and an extension portion 154 made up of a set of extension characters. In the FIG. 4A example, the extension portion 154 is made up of the extension characters ".html".

Figure 4B:
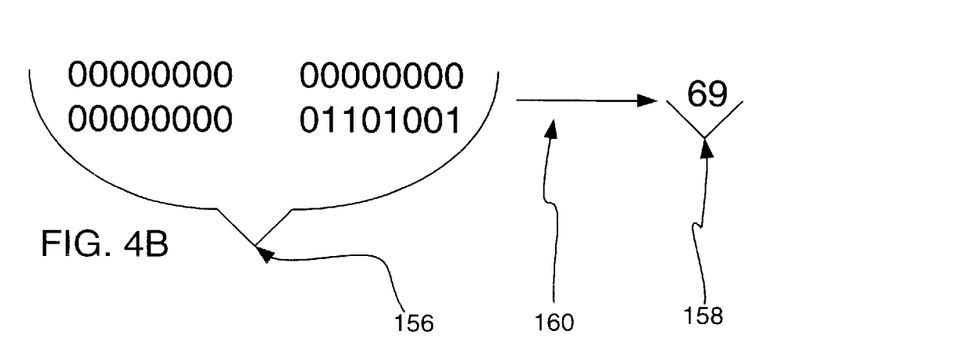
FIG. 4B illustrates a binary-to-hexadecimal conversion of a unique file identifier according to the invention.

FIG. 4B illustrates an example encoding of an example binary unique file identifier 156 to a hexadecimal encoded unique file identifier 158 through a binary-to-hexadecimal conversion 160. As shown, the binary unique file identifier 156 is formed of the digits: "00000000000000000000000001101001". The binary unique file identifier 156 is converted, using the binary-to-hexadecimal conversion 160, to an equivalent hexadecimal number to create the unique file identifier 158. In the present example, the lengthy binary number converts to the equivalent hexadecimal number "69" and, therefore, is represented by significantly fewer characters. Hence, the encoding process makes the unique file identifier shorter and, thus, more easily represented while maintaining the ability of the file identifier to identify a specific file on a given volume.

Figure 4C:
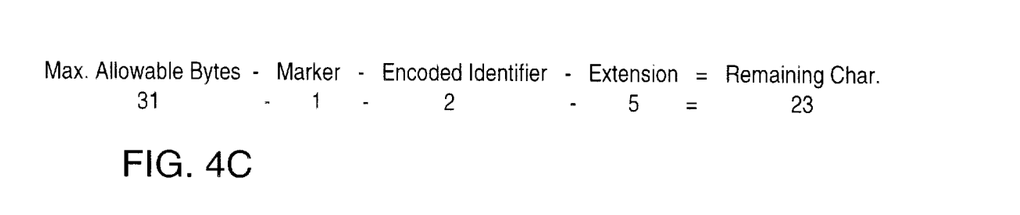
FIG. 4C illustrates a manner of calculating a number of remaining characters according to the invention.

FIG. 4C illustrates a manner in which the number of remaining characters may be calculated. In this example, the API at issue has a maximum acceptable file name length of 31 characters (31 bytes of single byte characters). The reduced file name marker is the pound sign ("#") and, thus, has a length of one character. The encoded identifier, as discussed above in connection with FIG. 4B, is "69" with a length of two characters. Lastly, the extension portion, as mentioned above, is ".html" and has a length of five characters.

The number of remaining usable characters, or the length of the primary portion after the primary portion of the file name has been truncated, is determined, as discussed above, by subtracting the number of reduced file name marker characters, the number of encoded identifier characters, and the number of extension characters from the maximum acceptable file name length. Applying this method to the present example provides the following: 31 (the maximum file name length), minus 1 (the length of the marker #), minus 2 (the length of the encoded identifier 69), minus 5 (the length of the extension .html), equals 23 (the byte length of the remaining characters). Consequently, in this example, the primary characters in excess of twenty-three will be truncated. In this manner, the number of remaining usable characters, or the length of the primary portion after the primary portion has been truncated, is determined.

Figure 4D:
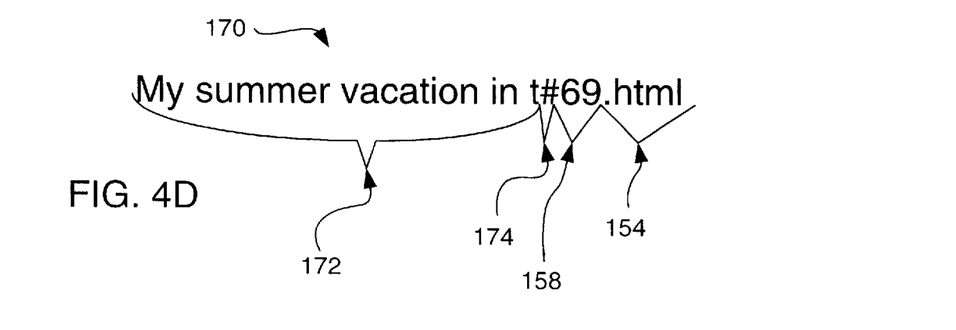
FIG. 4D illustrates a reduced file name formed in accordance with the invention.

FIG. 4D illustrates a reduced file name 170 formed in accordance with the present invention. As shown, the reduced file name 170 includes a truncated file name 172 "My summer vacation in t" formed of the first twenty-three (23) characters of the original file name 150 (FIG. 4A). The reduced file name marker 174 is positioned adjacent to the truncated file name 172 and consists of the pound sign "#". Immediately following the reduced file name marker 174 is the encoded identifier 158, calculated above in connection with FIG. 4B as being "69". The extension portion 154 includes the characters ".html" and is positioned at the end of the reduced file name 170.

Figure 5:
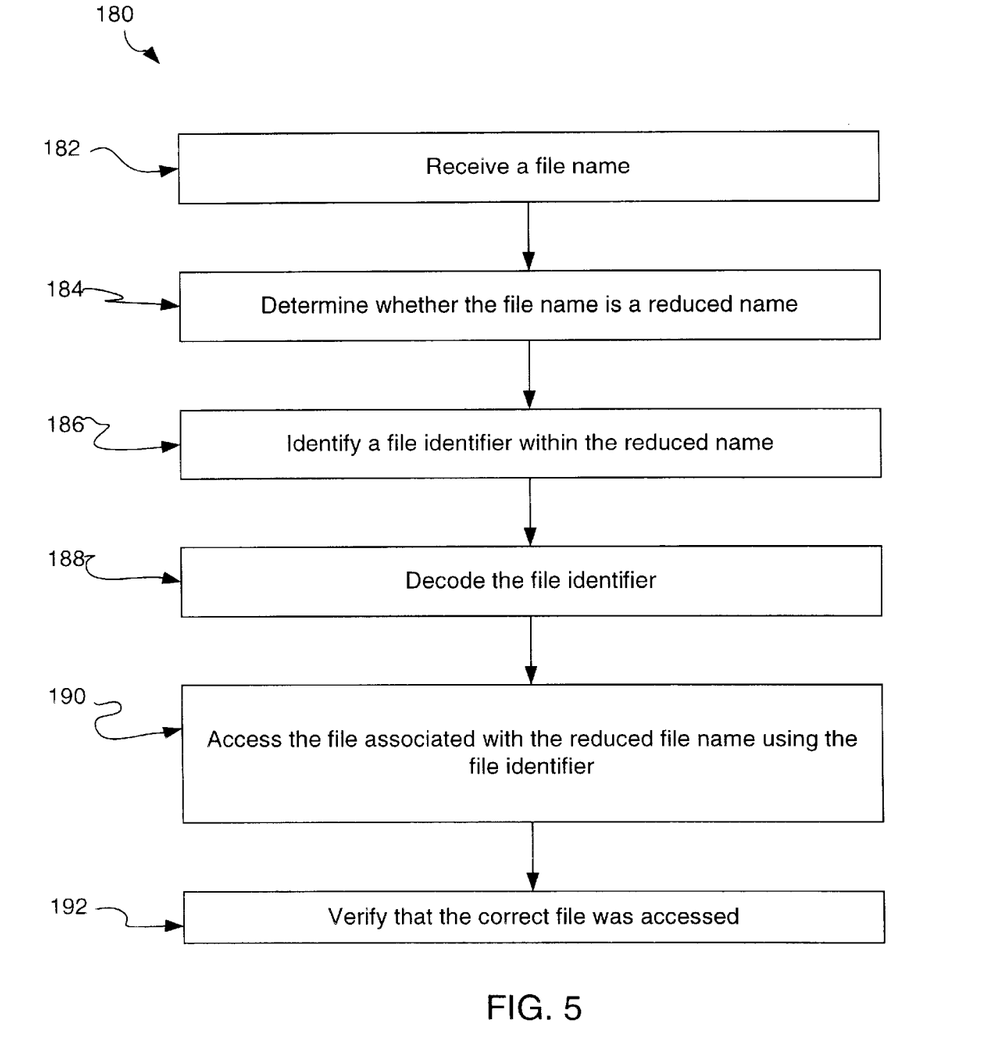
FIG. 5 is a flowchart illustrating a method for retrieving a file with a reduced file name according to the invention.

FIG. 5 is a flowchart 180 that outlines a method according to the present invention for retrieving a file using a reduced file name. First, as shown in block 182, the file manager 106 (FIG. 1) receives a file name via the API 104 from the application 102. The received file name corresponds to a file to be located on the storage volume 108 and accessed.

Then, as shown in block 184, the file manager attempts to locate a file having a name identical to the file name as received. If no such file is located, and as shown in block 186 of FIG. 5, the file manager 106 next determines whether the received file name is a "reduced" file name. In a presently preferred embodiment, the determination of whether a received file name is a reduced file name is accomplished as follows. Upon locating a reduced file name marker, the file manager then inspects the characters immediately following the reduced file name marker to determine whether these characters comprise a unique file identifier by checking to see if the characters are hexadecimal characters. If, at this point, a set of hexadecimal characters follows the reduced file name marker, the file manager assumes that the received name is a reduced file name and proceeds to access a file on that basis.

In addition, or alternatively, the file manager 106 can determine whether the received file name is a "reduced" file name by ignoring file names having more than eight (8) hexadecimal digits following the file identifier or by ignoring file names having a zero as the first character following the file identifier. Also, the file manager can check whether the characters following the hexadecimal digits comprises a proper extension (i.e. starting with a period "." with no more than five (5) characters after the period). These additional checks may be advantageous in applications where locating a file by its identifier is time consuming, such as a linear search through the directory contents.

Next, as represented by block 188, the file manager identifies the file identifier embedded within the reduced file name. In a preferred embodiment, the file identifier is identified, and extracted, from within the reduced file name by locating the reduced file name marker and the extension portion of the reduced file name. The file identifier consists of the characters between the reduced file name marker and the file name extension. By this manner, the file identifier is identified and extracted from within the reduced file name.

Once the unique file identifier is identified and extracted from within the reduced file name, the file identifier, if encoded, is decoded as indicated by block 190 of FIG. 5. In a preferred embodiment, the file identifier is a binary number that is encoded by conversion to an equivalent hexadecimal number. Accordingly, the encoded file identifier is a hexadecimal number that may be decoded by a hexadecimal-to-binary conversion back to a binary number.

Next, as shown by block 192 of FIG. 5, the file associated with the reduced file name is located and accessed using the 32 bit binary number file identifier. Because, as discussed above, each file on a volume has an associated unique file identifier, any file on the volume may be reliably accessed using the unique file identifier. Indeed, the data structure 140 (FIG. 3) further includes information that permits the original file name to be determined based on the unique file identifier. So, given a unique file identifier, the file manager can locate the corresponding original file name and access the associated file.

As a precautionary measure, and in case of a corrupted disk, the original file name, as obtained using the unique file identifier, is verified to be that of the correct file, as represented by block 194 of FIG. 5. One manner of verifying that the obtained file corresponds with the reduced file name, as received, is to perform the method of reducing a file name as described above in connection with FIG. 2 on the obtained original file name to form a verifying reduced file name. The verifying reduced file name is then compared with the reduced file name as received by the file manager. Having a verifying reduced file name identical to the reduced file name as received by the file manager confirms and verifies that the identified file properly corresponds with the reduced file name as received.

Finally, it should be noted that pursuant to the presently preferred embodiment described above, the reduced file names are guaranteed to be unique with respect to each other, but are not guaranteed to be unique with respect to "non-reduced" file names. However, the likelihood of identical reduced and non-reduced file names is so remote, that it may be reasonably be ignored in most applications. This issue, can be addressed by merely preventing file names from being created that look the same as a reduced file name.

Alternatively, all file names could be reduced, regardless of length or content, so that every file name has a unique identifier.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for reducing a computer file name length, comprising:

receiving an original file name associated with a file and having an original file name length;

receiving a unique file identifier associated with the file and having a file identifier length;

truncating a portion of the original file name to create a truncated file name; and combining the file identifier and the truncated file name to create a reduced file name having a reduced file name length.

2. The method according to claim 1 further comprising:

encoding the file identifier;

wherein the step of combining combines the file identifier, as encoded, with the truncated file name.

3. The method according to claim 2 wherein the file identifier comprises a binary number and the step of encoding further comprises converting the binary number to a hexadecimal number.

4. The method according to claim 1 wherein the original file name further comprises a primary portion and an extension portion, and wherein the step of truncating truncates only the primary portion of the original file name.

5. A method according to claim 1 wherein the original file name includes a primary portion having a primary portion length and an extension portion having an extension portion length, further comprising:

encoding the file identifier to create an encoded file identifier having an encoded file identifier length;

wherein the step of truncating further comprises subtracting from the original file name primary portion a string of characters at least a long as the encoded file identifier length.

6. The method according to claim 1 wherein the file identifier comprises a unique number assigned to the file upon creation of the file.

7. The method according to claim 1 further comprising:

selecting a reduced file name length; and comparing the original file name length with the reduced file name length to determine whether the original file name length exceeds the reduced file name length.

8. The method according to claim 1 wherein the original file name includes a primary portion having a primary portion length and an extension portion having an extension portion length, further comprising:

creating a marker to indicate a reduced file name, the marker having a marker length;

selecting a reduced file length;

wherein the step of truncating subtracts, from the primary portion of the original file name, a character string having a byte length equal to, or less than, the sum of the reduced file name length, the marker length, and the file identifier length.

9. The method according to claim 1 wherein the original file name includes a primary portion having a primary portion length and an extension portion having an extension portion length, further comprising:

creating a marker to indicate a reduced file name, the marker having a marker length;

selecting a reduced file length; and encoding the file identifier to create an encoded file identifier having an encoded file identifier length;

wherein the step of truncating subtracts, from the primary portion of the original file name, a character string having a byte length equal to, or less than, the sum of the reduced file name length, the marker length, and the encoded file identifier length.

10. The method according to claim 1 wherein the original file name includes a primary portion having a primary portion length and an extension portion having an extension portion length, further comprising:

creating a marker to indicate a reduced file name, the marker having a marker length; and encoding the file identifier to create an encoded file identifier having an encoded file identifier length;

wherein the step of combining combines the truncated file name, the marker, the file identifier, and the extension portion as encoded, to create a reduced file name comprising the truncated file name, the marker, the encoded file identifier, and the extension portion.

11. A method according to claim 10 wherein the reduced file name comprises, in series, the truncated file name, the marker, the encoded file identifier, and the extension portion in that order.

12. A method for reducing a computer file name length, comprising:

retrieving an original file name, having an original file name length and an original file identifier;

dividing the original file name into a set of primary characters and a set of extension characters;

encoding the original file identifier to create a shortened identifier having a set of shortened identifier characters;

selecting a reduced file name length that is shorter than the original file name length;

truncating the set of primary characters to form a truncated file name; and concatenating the truncated file name with the set of shortened identifier characters and the set of extension characters to create a reduced file name;

whereby the reduced file name has a length shorter than or equal to the reduced file name length.

13. The method according to claim 12 wherein the original file identifier further comprises a unique set of characters assigned to a file associated with the original file name upon creation of the file.

14. The method according to claim 12 wherein the unique set of characters comprises a binary number, and the step of encoding converts the binary number to a hexadecimal number.

15. The method according to claim 12, further comprising the step of combining the reduced file name with a reduced file name marker to form the reduced file name.

16. The method according to claim 15 wherein the reduced file name comprises the truncated file name, the marker, the set of shortened identifier characters, and the set of extension characters in that order.

17. A method of creating a valid computer file name, comprising:

determining whether an original file name associated with a file includes an unrepresentable character;

replacing each unrepresentable character with a representable character to form a modified file name;

identifying a unique file identifier associated with the file; and appending the file identifier to the modified file name to form a reduced file name.

18. The method according to claim 17 further comprising:

dividing the original file name into a primary portion and an extension portion;

appending the extension portion to the primary portion of the original file name.

19. The method according to claim 17 further comprising:

dividing the original file name into a primary portion and an extension portion;

truncating characters from the primary portion of the file name.

20. The method according to claim 17 wherein the unique file identifier comprises a binary number, further comprising:

converting the unique file identifier to a hexadecimal number to create an encoded file identifier;

wherein the step of appending appends the encoded file identifier to the modified file name.

21. The method according to claim 17 further comprising:

dividing the original file name into a primary portion and an extension portion;

encoding the unique file identifier to create an encoded file identifier;

wherein the step of appending appends the encoded file identifier to the primary portion of the modified file name.

22. A method of retrieving a computer file using a reduced file name, comprising:

providing a data volume having a file and a reduced file name associated with the file, the reduced file name having a primary portion and a file identifier portion;

identifying the file identifier portion; and retrieving the file from the data volume based exclusively on the file identifier portion.

23. The method according to claim 22, wherein the file identifier portion is encoded, and further comprising the step of decoding the file identifier portion.

24. The method according to claim 22 wherein the file identifier portion comprises a unique number associated with the file upon creation of the file.

25. The method according to claim 24, wherein the file identifier portion comprises a hexadecimal number, and further comprises the step of converting the file identifier portion to a binary number.

26. A system for reducing computer file name length, comprising:

means for receiving an original file name associated with a file and having an original file name length;

means for receiving a file identifier associated with the file, and having a file identifier length;

means for truncating a portion of the original file name to create a truncated file name; and means for combining the file identifier and the truncated file name to create a reduced file name having a reduced file name length.

27. The system according to claim 26, further comprising:

means for encoding the file identifier;

wherein the means for combining combines the file identifier, as encoded, with the truncated file name.

28. The system according to claim 26, wherein the original file name comprises a primary portion and an extension portion, and wherein the means for truncating truncates only the primary portion of the original file name.

29. The system according to claim 26 wherein the original file name includes a primary portion having a primary portion length and an extension portion having an extension portion length, further comprising:
means for selecting a reduced file name length that is shorter than the original file name length; and
means for encoding the file identifier to create an encoded file identifier having a encoded file identifier length;
wherein the means for truncating subtracts from the primary portion a string of characters at least a long as the encoded file identifier length.

30. The system according to claim 26 further comprising:
means for encoding the file identifier;
wherein the file identifier comprises a binary number and the means for encoding converts the binary number to a hexadecimal number, the means for combining combines the file identifier, as encoded, with the truncated file name.

31. The system according to claim 26 wherein the file identifier comprises a unique number assigned to the file upon creation of the file.

32. The system according to claim 26 further comprising:
means for selecting a reduced file name length; and
means for determining whether the original file name length exceeds the reduced file name length.

33. The system according to claim 26 wherein the original file name includes a primary portion having a primary portion length and an extension portion having an extension portion length, further comprising:
means for creating a marker to indicate a reduced file name, the marker having a marker length; and
means for selecting a reduced file length;
wherein the means for truncating subtracts from the primary portion a character string having a length equal to the sum of the reduced file name length, the marker length, and the file identifier length.

34. The system according to claim 26 wherein the original file name includes a primary portion having a primary portion length and an extension portion having an extension portion length, further comprising:
means for creating a marker to indicate a reduced file name, the marker having a marker length;
means for selecting a reduced file length; and
means for encoding the file identifier to create an encoded file identifier having an encoded file identifier length;
wherein the means for truncating subtracts from the primary portion of the original file name a character string having a length equal to the sum of the reduced file name length, the marker length, and the encoded file identifier length.

35. The system according to claim 26 wherein the original file name includes a primary portion having a primary portion length and an extension portion having an extension portion length, further comprising:
means for creating a marker to indicate a reduced file name, the marker having a marker length; and
means for encoding the file identifier to create an encoded file identifier having an encoded file identifier length;
wherein the means for combining combines the truncated file name, the marker, and the file identifier, as encoded, to create a reduced file name comprising the truncated file name, the marker, the encoded file identifier, and the extension portion.

36. The system according to claim 35 wherein the reduced file name comprises, the truncated file name, the marker, the encoded file identifier, and the extension portion in that order.

37. A system for retrieving a computer file using a reduced file name, comprising:
means for providing a data volume having a file and a reduced file name associated with the file, the reduced file name having a primary portion and a file identifier portion;
means for identifying the file identifier portion; and
means for retrieving the file from the data volume based exclusively on the file identifier portion.

38. The system according to claim 37, wherein the file identifier portion is encoded, and further comprising the means for decoding the file identifier portion.

39. The system according to claim 37, wherein the file identifier portion comprises a unique number associated with the file upon creation of the file.

40. The system according to claim 39, wherein the file identifier portion comprises a hexadecimal number, and further comprising means for converting the file identifier portion to a binary number.

41. The system according to claim 37 wherein the file identifier portion is encoded.

42. A computer-readable medium containing instructions for causing a computer to create a valid file name by performing the steps of:
receiving an original file name associated with a file and having an original file name length;
receiving a unique file identifier associated with the file and having a file identifier length;
truncating a portion of the original file name to create a truncated file name; and
combining the file identifier and the truncated file name to create a reduced file name having a reduced file name length.

43. The computer-readable medium of claim 42, further comprising the step of:
encoding the file identifier;
wherein the step of combining combines the file identifier, as encoded, with the truncated file name.

44. The computer-readable medium of claim 42, wherein the file identifier comprises a binary number and the step of encoding further comprises converting the binary number to a hexadecimal number.

45. The computer-readable medium of claim 42 wherein the original file name further comprises a primary portion and an extension portion, and wherein the step of truncating truncates only the primary portion of the original file name.

46. The computer-readable medium of claim 42 wherein the file identifier comprises a unique number assigned to the file upon creation of the file.

47. The computer-readable medium of claim 42 wherein the original file name includes a primary portion having a primary portion length and an extension portion having an extension portion length, further comprising:
creating a marker to indicate a reduced file name, the marker having a marker length;
selecting a reduced file length;
wherein the step of truncating subtracts, from the primary portion of the original file name, a character string having a length equal to the sum of the reduced file name length, the marker length, and the file identifier length.

* * * * *